United States Patent
Harger et al.

(10) Patent No.: US 9,702,395 B2
(45) Date of Patent: Jul. 11, 2017

(54) BONDING LUG WASHER

(71) Applicant: HARGER, INC., Grayslake, IL (US)

(72) Inventors: Mark S. Harger, Bristol, WI (US);
William Steve Marcomb, Antioch, IL (US)

(73) Assignee: HARGER, INC., Grayslake, IL (US)

( * ) Notice: Subject to any disclaimer, the term of this patent is extended or adjusted under 35 U.S.C. 154(b) by 26 days.

(21) Appl. No.: 14/804,634

(22) Filed: Jul. 21, 2015

(65) Prior Publication Data
US 2016/0025127 A1 Jan. 28, 2016

Related U.S. Application Data

(60) Provisional application No. 62/028,216, filed on Jul. 23, 2014.

(51) Int. Cl.
F16B 39/24 (2006.01)
F16B 43/00 (2006.01)

(52) U.S. Cl.
CPC .............. F16B 43/00 (2013.01); F16B 39/24 (2013.01)

(58) Field of Classification Search
CPC ........... F16B 39/22; F16B 39/24; F16B 43/00
USPC .......... 411/155, 531, 535, 538, 544
See application file for complete search history.

(56) References Cited

U.S. PATENT DOCUMENTS

| | | | | |
|---|---|---|---|---|
| 160,862 A * | 3/1875 | Adgate | .................. | F16B 39/24 411/101 |
| 347,147 A * | 8/1886 | Anderson | ............... | F16B 39/24 411/131 |
| 528,237 A * | 10/1894 | Robbins | .................. | F16B 39/24 411/101 |
| 804,580 A * | 11/1905 | Burnham | ................ | F16B 39/24 411/101 |
| 2,277,443 A * | 3/1942 | Livingston | ............. | H01H 50/56 200/1 A |
| 2,334,773 A * | 11/1943 | Johnson | .................... | E04B 1/49 411/466 |
| 2,406,079 A * | 8/1946 | Krueger | .................... | H01R 4/16 29/12 |
| 4,140,870 A * | 2/1979 | Volkers | .................. | H01R 4/646 174/78 |
| 4,740,124 A * | 4/1988 | Pearson | .................. | F16B 39/22 411/339 |
| 5,599,131 A * | 2/1997 | Julen | ....................... | F16B 43/00 403/312 |
| 2008/0242129 A1 | 10/2008 | Younce et al. | | |
| 2013/0084126 A1 * | 4/2013 | DeMont | .................... | F16G 3/08 403/312 |

* cited by examiner

Primary Examiner — Roberta Delisle
(74) Attorney, Agent, or Firm — Michael Best & Friedrich LLP

(57) ABSTRACT

A washer includes a perimeter portion, a support edge adjoining the perimeter portion and defining a first plane, and a contact portion having a generally planar contact surface. The contact surface defines a second plane parallel to and spaced from the first plane. The contact portion further includes at least two apertures extending therethrough. The washer further includes a rim portion extending between the perimeter portion and the contact portion. The rim portion surrounds the contact portion and forms an angle with the first plane of between 6 and 20 degrees. The contact portion and the rim portion are integrally formed as one-piece.

23 Claims, 9 Drawing Sheets

BONDING LUG WASHER

BACKGROUND

The present disclosure relates to a bonding lug washer, and more particularly to a cupped bonding lug washer.

SUMMARY

In one embodiment, the disclosure provides a washer including a perimeter portion, a support edge adjoining the perimeter portion and defining a first plane, and a contact portion having a generally planar contact surface. The contact surface defines a second plane parallel to and spaced from the first plane. The contact portion further includes at least two apertures extending therethrough. The washer further includes a rim portion extending between the perimeter portion and the contact portion. The rim portion surrounds the contact portion and forms an angle with the first plane of between 6 and 20 degrees. The contact portion and the rim portion are integrally formed as one-piece.

In another embodiment, the disclosure provides a washer including a perimeter portion, a support edge adjoining the perimeter portion and defining a first plane, and a contact portion having a contact surface. The contact surface defines a second plane spaced apart from the first plane. The contact portion further includes at least two apertures extending therethrough. The washer further includes a rim portion extending between the perimeter portion and the contact portion. The rim portion surrounding the contact portion and forming an angle with the first plane.

In yet another embodiment, the disclosure provides a washer including a contact portion having a planar contact surface, an underside opposing the planar contact surface, and at least two apertures extending from the contact surface to the underside. The washer also including a rim portion integrally formed with and surrounding the contact portion. The rim portion has a first semi-annular segment, a second semi-annular segment opposing the first semi-annular segment, a first linear segment, and a second linear segment. The first linear segment extends from the first semi-annular segment to the second semi-annular segment on a first side of the contact portion. The second linear segment extends from the first semi-annular segment to the second semi-annular segment on a second side of the contact portion. An underside of the rim portion is continuous with the underside of the contact portion and defines a cavity therewith.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1A:
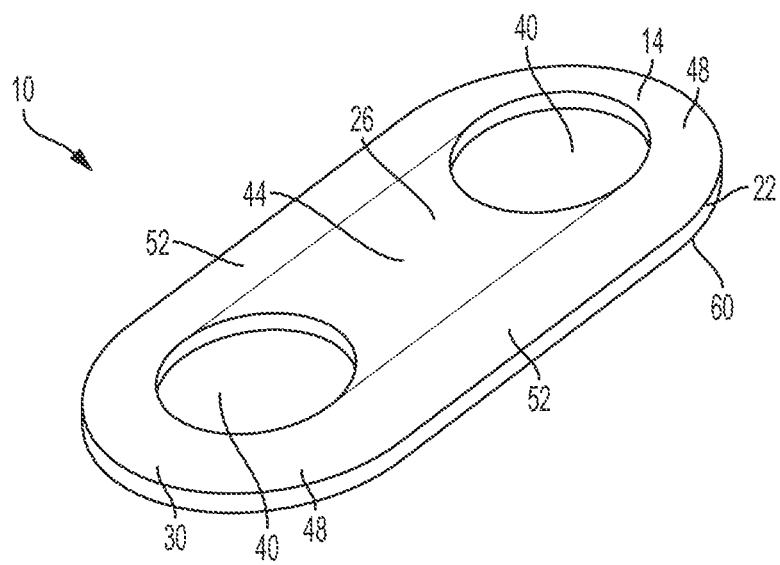
FIG. 1A is a perspective view of a bonding lug washer.
Figure 1B:
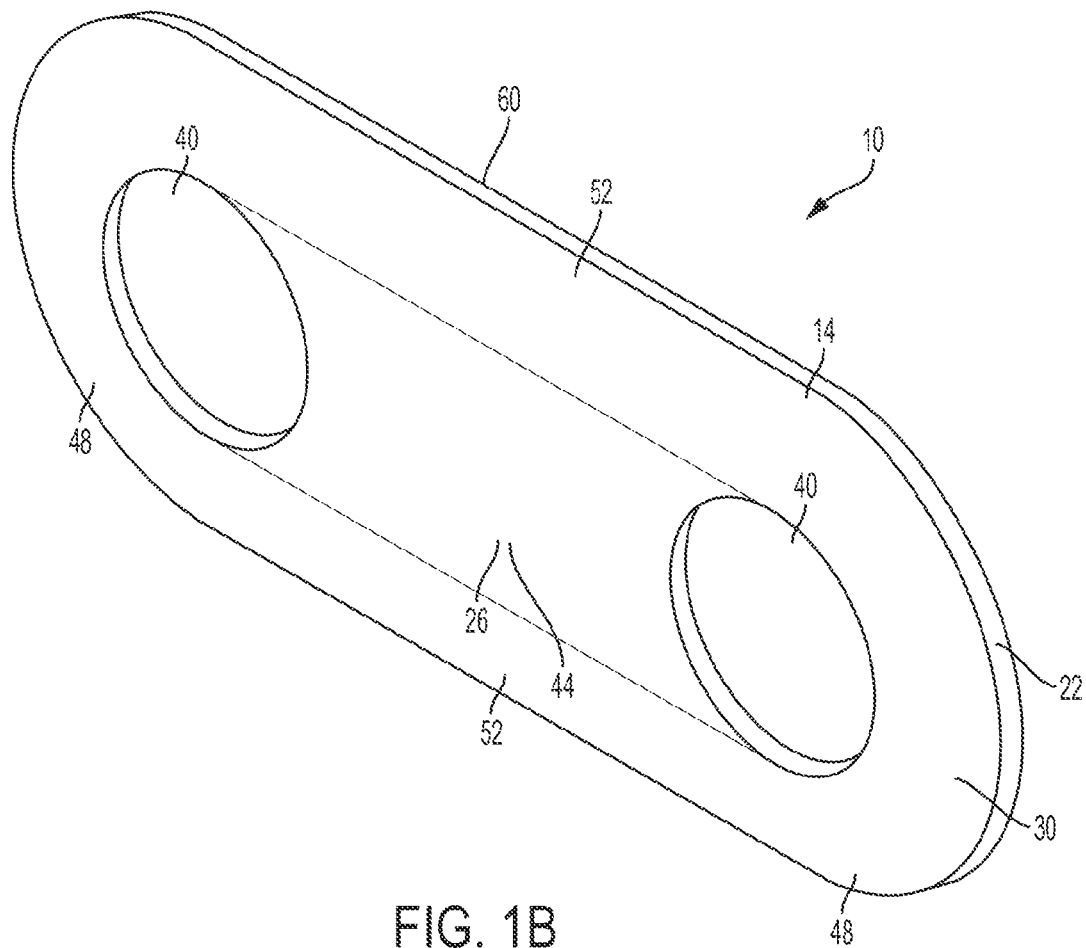
FIG. 1B is another perspective view of the washer of FIG. 1A.
Figure 2:
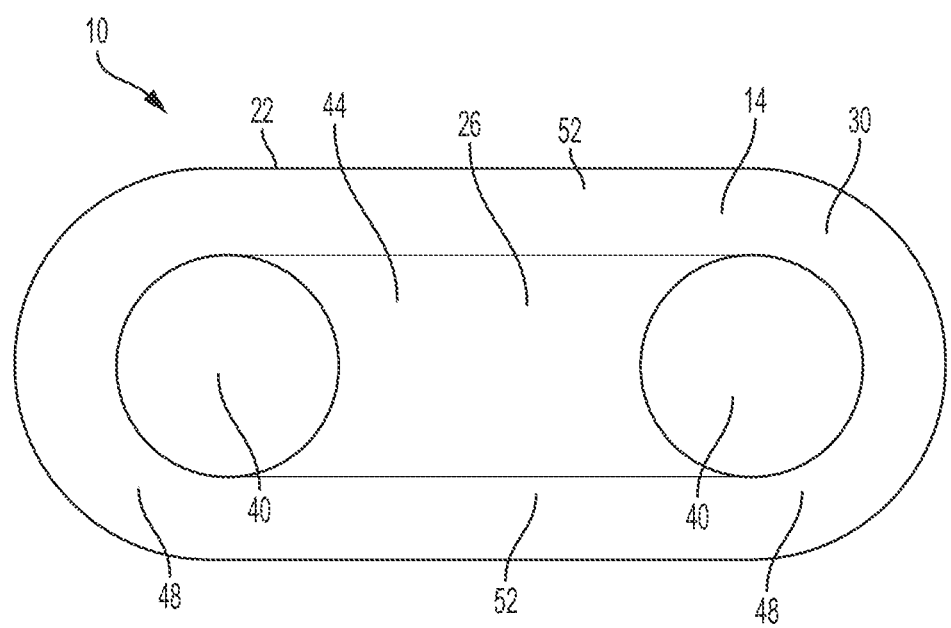
FIG. 2 is a top view of the washer of FIG. 1A.

Referring to FIGS. 1A-2, a washer 10 includes a main body 14 defining a peripheral perimeter portion 22, a contact portion 26, and a rim portion 30 extending between the perimeter portion 22 and the contact portion 26. The contact portion 26 includes two spaced apertures 40 extending therethrough, each configured for receiving a threaded fastener along a central axis H (see FIGS. 5A and 5B). Other embodiments may have more than two apertures as suitable for the application. The contact portion 26 presents a generally planar contact surface 44 that defines a contact plane A (see FIG. 5B) coextensive with the surface 44. The rim portion 30 surrounds the contact portion 26 and comprises two semi-annular segments 48 connected by parallel linear sections 52. The perimeter portion 22 extends between the rim portion and a bottom support edge 60.

Figure 3:
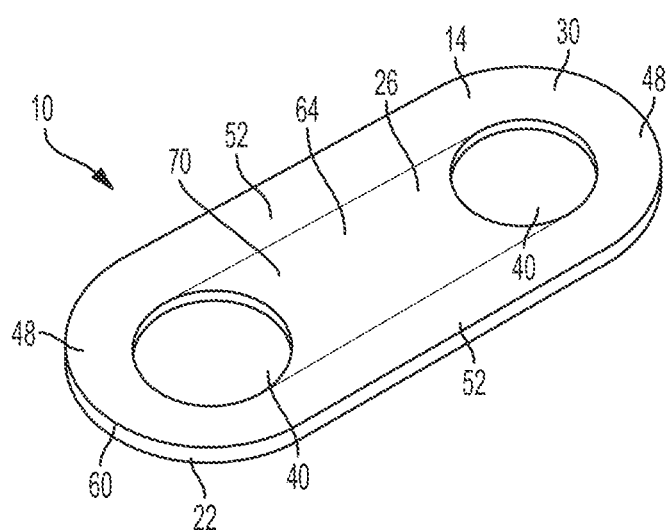
FIG. 3 is a bottom perspective view of the washer of FIG. 1A.
Figure 4:
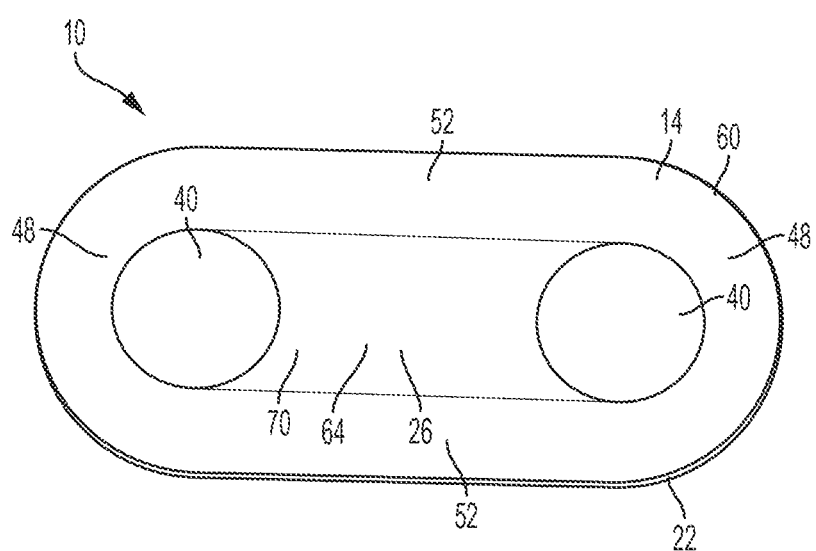
FIG. 4 is a bottom view of the washer of FIG. 1A.

FIGS. 3-4 illustrate the bottom side of the washer 10 opposite to that shown in FIGS. 1A-2. The contact portion 26 presents a surface 64 opposite the contact surface 44.

Figure 5A:
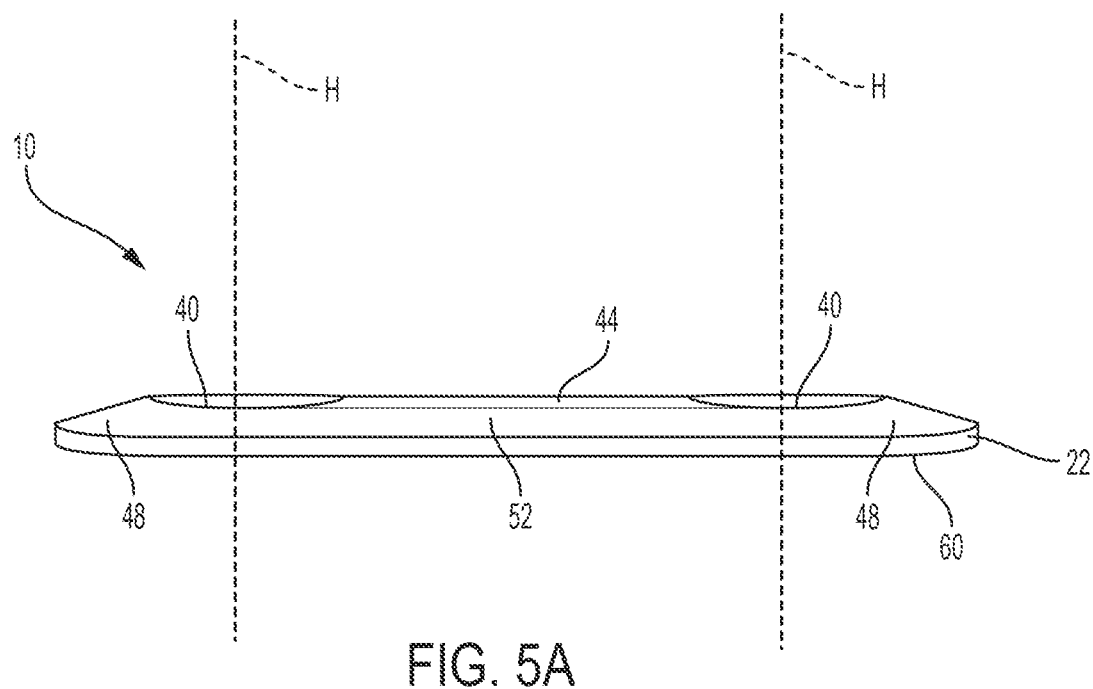
FIG. 5A is a side perspective view of the washer of FIG. 1A.

In one embodiment, the washer 10 is 1.75 inches in length by 0.75 inches in width. Referring also to FIGS. 5A-6, the contact portion 26 has a thickness of approximately 0.04 inches, and the surrounding rim portion 30 is likewise approximately 0.04 inches in thickness. The contact surface 44 is spaced a distance along the axis H from the support edge 60 of approximately 0.08 inches. As a result, the distance from the surface 64 along the axis H to the support edge 60 is approximately 0.04 inches. Thus, the contact plane A also lies spaced apart from the base plane B by approximately 0.08 inches. As shown, the apertures 40 are of uniform size for receiving, for example, ⅜ inch hardware and are centered, for example, 1 inch apart.

In another embodiment, the washer 10 is 1.13 inches in length by 0.50 inches in width. The contact portion 26 has a thickness of approximately 0.032 inches, and the surrounding rim portion 30 is likewise approximately 0.032 inches in thickness. The contact surface 44 is spaced a distance along the axis H from the support edge 60 of approximately 0.064 inches. As a result, the distance from the surface 64 along the axis H to the support edge 60 is approximately 0.032 inches. Thus, the contact plane A also lies spaced apart from the base plane B by approximately 0.064 inches. As shown, the apertures 40 are of uniform size for receiving, for example, ¼ inch hardware and are centered, for example, 0.625 inches apart.

In yet other embodiments, the washer 10 may be between 0.50 inches and 2.50 inches in length and between 0.20 inches and 1.25 inches in width. The contact portion 26 and the surrounding rim portion 30 may have thicknesses between 0.01 inches and 0.1 inches. The contact surface 44 may be spaced a distance along the axis H from the support edge between 0.02 inches and 0.2 inches. As a result, the distance from the surface 64 along the axis H to the support edge 60 may be between 0.01 inches and 0.1 inches. Thus, the contact plane A also lies spaced apart from the base plane B by between 0.02 inches and 0.2 inches. The apertures 40 may be of uniform size for receiving, for example, hardware ranging in size from ¹⁄₃₂ inch to ¾ inch, and are centered, for example, between 0.25 inches to 2.0 inches apart.

The aforementioned parameters, including hole size and spacing, can be differently dimensioned as necessary for the application. Furthermore, each hole may be differently sized as necessary.

Figure 5B:
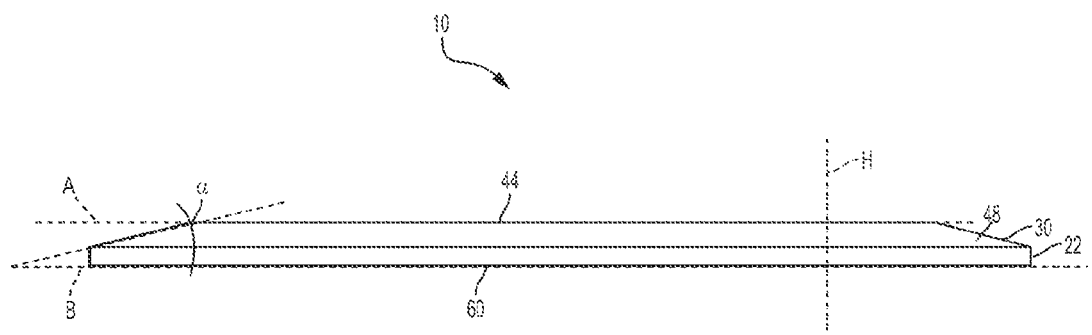
FIG. 5B is a side view of the washer of FIG. 1A.
Figure 6:
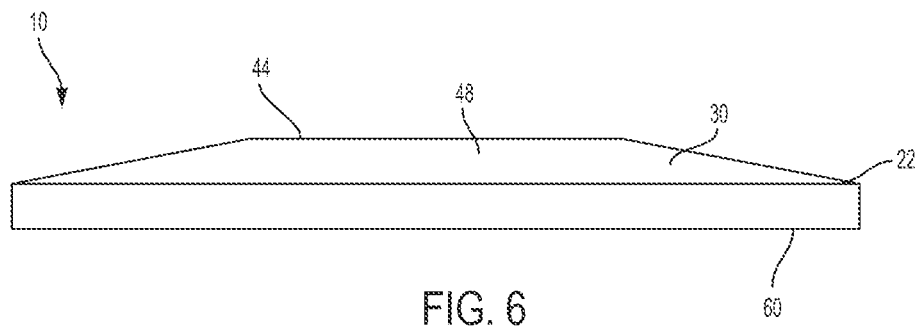
FIG. 6 is an end view of the washer of FIG. 1A.

Referring to FIG. 5B, the support edge 60 lies within a defined base plane B. In the illustrated embodiment, the base plane B is parallel with the contact plane A. The rim portion 30 forms an acute angle α with the support face 60 (and the base plane B). In the illustrated embodiment, the angle α is between 4 and 45 degrees, but may differ in other embodiments. For example, in the aforementioned embodiment of the washer 10 that is 1.75 inches in length by 0.75 inches in length, the angle α is preferably approximately 12 degrees. In the aforementioned embodiment of the washer 10 that is 1.13 inches in length by 0.50 in width, the angle α is preferably approximately 14 degrees.

Referring again to FIG. 5B, the perimeter portion 22 forms a right angle with the base plane B. In other embodiments, the perimeter portion 22 may form an angle that is between 70 and 110 degrees with the base plane B. In yet other embodiments, the perimeter portion 22 may form other angles with the base plane B.

Referring again to FIG. 3, the geometry of surface 64 and the adjoining rim portion 30 define a volume or cavity 70, i.e., the underside of the washer 10 forms a volume or cavity 70. Specifically, this volume 70 extends from the base plane B (FIG. 5B) to the surface 64 and is bounded by the bottom side or underside of the rim portion 30.

The washer 10 is integrally formed as one piece from a metal, preferably a 300 series stainless steel, and more preferably type 301 stainless steel. The washer is manufactured with a metal stamping process, but in additional embodiments, other suitable manufacturing techniques may be used.

Figure 7:
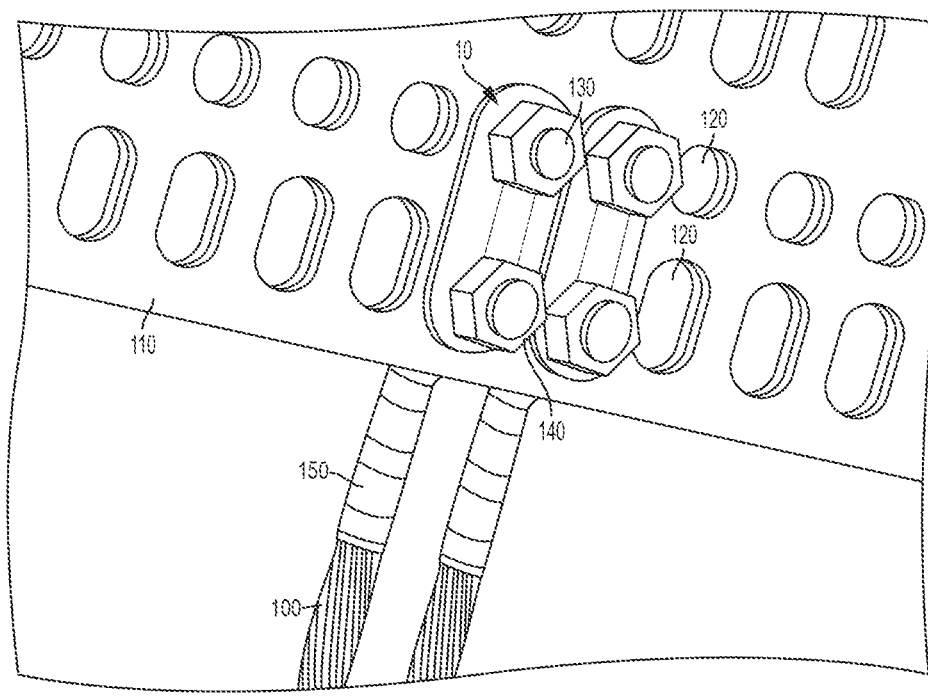
FIG. 7 is a perspective view of a pair of washers operatively coupling a compression lug to a grounding busbar.

FIG. 7 illustrates a washer 10 in use for operatively coupling a conductor 100 to a grounding busbar 110 in a bonding application. In operation, the mounting apertures (not shown) of a compression lug 150 (partially shown) of the conductor 100 and the apertures 40 of a washer 10 are aligned on either side of two of the apertures 120 formed in the busbar 110. Two bolts 130 are received through the washer 10, the busbar 110, and the compression lug 150, and the compression lug 150 is thereafter secured to the busbar 110 with nuts 140. Two such connections are shown in FIG. 7.

The geometry of the washer 10, as previously described, assists in keeping the compression lug 150 secured to the busbar 110. When the nuts 140 are tightened, a direct force or compression force is applied to the washer 10 onto the contact surface 44 in a direction perpendicular to the contact plane A. Due to the aforementioned geometry of the washer 10, the washer 10 exerts a reactionary force through the contact surface 44 opposing or in response to the compression force. This reactionary force further compresses the mating threads of the nuts 140 and bolts 130 to further reduce the tendency for the nuts 140 to loosen from the bolts 130.

Although the bonding lug washer has been described in detail with reference to certain preferred embodiments, variations and modifications exist within the scope and spirit of one or more independent claims of the disclosure as described.

What is claimed is:

1. A washer comprising:
   a perimeter portion;
   a support edge adjoining the perimeter portion and defining a first plane;
   a contact portion having a generally planar contact surface, the contact surface defining a second plane parallel to and spaced from the first plane, the contact portion extending between and including at least two apertures extending therethrough; and
   a rim portion extending between the perimeter portion and the contact portion, the rim portion surrounding the contact portion and forming an angle with the first plane of between 6 and 20 degrees,
   wherein the contact portion and the rim portion are integrally formed as one piece.

2. The washer of claim 1, wherein the perimeter portion and the first plane are perpendicular.

3. The washer of claim 1, wherein the angle is between 12 and 15 degrees.

4. The washer of claim 1, wherein the washer is configured to exert a force in response to a compressive force acting against the contact surface.

5. A washer comprising:
   a perimeter portion;
   a support edge adjoining the perimeter portion and defining a first plane;
   a contact portion having a contact surface, the contact surface defining a second plane spaced apart from the first plane, the contact portion further including at least two apertures extending therethrough; and
   a rim portion extending between the contact portion and a peripheral edge of the perimeter portion, the rim portion surrounding the contact portion and forming an angle with the first plane.

6. The washer of claim 5, wherein the angle is between 4 and 45 degrees.

7. The washer of claim 5, wherein the angle is between 6 and 20 degrees.

8. The washer of claim 5, wherein the angle is between 12 and 15 degrees.

9. The washer of claim 5, wherein the support edge is spaced from the contact portion by no less than 0.02 inches.

10. The washer of claim 5, wherein the at least two apertures are configured for receiving a threaded fastener.

11. The washer of claim 5, wherein a thickness of the rim portion is between 0.02 and 0.1 inches.

12. The washer of claim 5, wherein a thickness of the contact portion is between 0.02 and 0.1 inches.

13. The washer of claim 5, wherein the rim portion comprises a first semi-annular segment, a second semi-annular segment, and a linear segment spanning between the first semi-annular segment and the second semi-annular segment.

14. The washer of claim 5, wherein the contact portion and the rim portion are integrally formed as one piece.

15. The washer of claim 5, wherein the contact portion is configured to exert a reactionary force opposing a direct force acting on the contact surface.

16. A washer comprising:
   a contact portion including a planar contact surface, an underside opposing the planar contact surface, and at least two apertures extending from the contact surface to the underside; and
   a rim portion integrally formed with and surrounding the contact portion, the rim portion including a first semi-annular segment, a second semi-annular segment opposing the first semi-annular segment, a first linear segment, and a second linear segment, wherein the first linear segment extends from the first semi-annular segment to the second semi-annular segment on a first side of the contact portion, and wherein the second linear segment extends from the first semi-annular segment to the second semi-annular segment on a second side of the contact portion,
wherein an underside of the rim portion is continuous with the underside of the contact portion and defines a cavity therewith, wherein the cavity extends between the at least two apertures.

17. The washer of claim 16, wherein the rim portion is angled with respect to the planar contact surface by more than five degrees.

18. The washer of claim 16, wherein the washer is configured to be compressed, at the contact portion, such that the cavity decreases in volume, and wherein the washer is further configured to exert a reactionary force in response to the decreased volume of the cavity.

19. A washer comprising:
a perimeter portion;
a support edge adjoining the perimeter portion and defining a first plane;
at least one contact portion formed from at least one generally planar contact surface, the at least one contact surface defining a second plane parallel to and spaced from the first plane;
at least two apertures extending through at least one of the contact portions; and
a continuous rim portion extending between a peripheral edge of the perimeter portion and the at least one contact portion, the continuous rim portion surrounding both apertures and the contact portion and forming an angle with the first plane.

20. The washer of claim 19, wherein the at least one contact portion is formed by a single contact surface and the at least one contact portion extends between the at least two apertures, wherein the two apertures extend through the single contact surface.

21. The washer of claim 19, wherein the perimeter portion comprises a peripheral surface that extends around a circumference of the washer and adjoins the peripheral edge.

22. The washer of claim 19, wherein an underside of the rim portion is continuous with the underside of the at least one contact portion and defines a cavity therewith.

23. A washer comprising:
a perimeter portion;
a support edge adjoining the perimeter portion and defining a first plane;
a contact portion having a continuous contact surface, the continuous contact surface defining a second plane spaced apart from the first plane;
at least two apertures extending through the continuous contact surface; and
a continuous rim portion extending between the contact portion and a peripheral edge of the perimeter portion, the continuous rim portion surrounding the contact portion and both apertures and forming an angle with the first plane, wherein an underside of the continuous rim portion is continuous with the underside of the contact portion and defines a cavity therewith.

* * * * *

UNITED STATES PATENT AND TRADEMARK OFFICE
CERTIFICATE OF CORRECTION

| | | |
|---|---|---|
| PATENT NO. | : 9,702,395 B2 | |
| APPLICATION NO. | : 14/804634 | |
| DATED | : July 11, 2017 | |
| INVENTOR(S) | : Mark S. Harger et al. | |

It is certified that error appears in the above-identified patent and that said Letters Patent is hereby corrected as shown below:

In the Claims

Column 5, Lines 23 and 24, Claim 19: the text "at least two apertures extending through at least one of the contact portions; and" should be changed to --at least two apertures extending through the at least one contact portion; and--.

Column 5, Line 28, Claim 19: the text "both apertures and the contact portion and forming an" should be changed to --both apertures and the at least one contact portion and forming an--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*